United States Patent
Lim et al.

(10) Patent No.: US 11,817,585 B2
(45) Date of Patent: Nov. 14, 2023

(54) POSITIVE ELECTRODE HAVING IMPROVED ADHESION AND ENERGY DENSITY, AND LITHIUM SECONDARY BATTERY INCLUDING THE SAME

(71) Applicant: LG Chem, Ltd., Seoul (KR)

(72) Inventors: Jun Muk Lim, Daejeon (KR); Joo Yul Baek, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 165 days.

(21) Appl. No.: 16/959,294

(22) PCT Filed: Feb. 22, 2019

(86) PCT No.: PCT/KR2019/002252
§ 371 (c)(1),
(2) Date: Jun. 30, 2020

(87) PCT Pub. No.: WO2019/168308
PCT Pub. Date: Sep. 6, 2019

(65) Prior Publication Data
US 2021/0057749 A1    Feb. 25, 2021

(30) Foreign Application Priority Data
Feb. 27, 2018    (KR) ........................ 10-2018-0023971

(51) Int. Cl.
*H01M 4/62*    (2006.01)
*H01M 4/133*    (2010.01)
(Continued)

(52) U.S. Cl.
CPC ........... *H01M 4/623* (2013.01); *H01M 4/133* (2013.01); *H01M 4/663* (2013.01); *H01M 2004/028* (2013.01)

(58) Field of Classification Search
None
See application file for complete search history.

(56) References Cited

U.S. PATENT DOCUMENTS

| 2015/0076419 A1 | 3/2015 | Takahashi et al. |
| 2015/0083975 A1 | 3/2015 | Yeou et al. |

(Continued)

FOREIGN PATENT DOCUMENTS

| CN | 107580732 A | 1/2018 |
| EP | 8079155 A1 | 10/2016 |

(Continued)

OTHER PUBLICATIONS

International Search Report for Application No. PCT/KR2019/002252 dated Jun. 11, 2019, 2 pages.

(Continued)

*Primary Examiner* — Jonathan G Leong
*Assistant Examiner* — Tony S Chuo
(74) *Attorney, Agent, or Firm* — Lerner David LLP (57) ABSTRACT

A positive electrode includes: a current collector; and a positive electrode active material layer disposed on the current collector, wherein the positive electrode active material layer includes a positive electrode active material, a conductive material, and a binder, the conductive material contains at least one of carbon black or a carbon nanotube and the binder contains polyvinylidene fluoride to which a functional group is bonded, and the functional group has a carboxyl group, and in the polyvinylidene fluoride to which the functional group is bonded.

6 Claims, 4 Drawing Sheets

(51) Int. Cl.
*H01M 4/66* (2006.01)
*H01M 4/02* (2006.01)

(56) References Cited

U.S. PATENT DOCUMENTS

| | | |
|---|---|---|
| 2017/0338468 A1 | 11/2017 | Kim et al. |
| 2018/0159131 A1 | 6/2018 | Seol et al. |
| 2018/0198129 A1 | 7/2018 | Kim et al. |
| 2018/0269485 A1 | 9/2018 | Yoo et al. |
| 2018/0366733 A1 | 12/2018 | Takaoka et al. |
| 2019/0044150 A1 | 2/2019 | Kim et al. |
| 2020/0235401 A1 | 7/2020 | Sakai et al. |

FOREIGN PATENT DOCUMENTS

| | | |
|---|---|---|
| KR | 20150008057 A | 1/2015 |
| KR | 20160066498 A | 6/2016 |
| KR | 20160087353 A | 7/2016 |
| KR | 20170037458 A | 4/2017 |
| KR | 20170049459 A | 5/2017 |
| KR | 101739299 B1 | 6/2017 |
| KR | 20170090720 A | 8/2017 |
| KR | 20170111749 A | 10/2017 |
| KR | 20170113250 A | 10/2017 |
| WO | 9850479 A1 | 11/1998 |
| WO | 2017074124 A1 | 5/2017 |
| WO | 2017098682 A1 | 6/2017 |
| WO | 2018008262 A1 | 1/2018 |

OTHER PUBLICATIONS

Extended European Search Report including Written Opinion for Application No. EP19760981.1, dated Nov. 27, 2020, pp. 1-9.
Search Report dated Sep. 15, 2022 from the Office Action for Chinese Application No. 201980007104.6 dated Sep. 27, 2022, pp. 1-2.

POSITIVE ELECTRODE HAVING IMPROVED ADHESION AND ENERGY DENSITY, AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2019/002252, filed Feb. 22, 2019, which claims priority to Korean Patent Application No. 10-2018-0023971, filed Feb. 27, 2018, the disclosures of which are incorporated herein by reference.

TECHNICAL FIELD

The present invention relates to a positive electrode and a secondary battery including said positive electrode, the positive electrode including: a current collector; and a positive electrode active material layer disposed on the current collector, wherein the positive electrode active material layer includes a positive electrode active material, a conductive material, and a binder, the conductive material contains at least any one among carbon black and a carbon nanotube and the binder contains polyvinylidene fluoride to which a functional group is bonded, and the functional group has a carboxyl group, and in the polyvinylidene fluoride to which the functional group is bonded, a content of the carboxyl group calculated by Equation 1 below is 1.1-3.0 mol %:

$$[B/(A+B)] \times 100 \qquad \text{[Equation 1]}$$

where A is an integral value from a peak of a vinylidene fluoride-derived unit in the $^1$H NMR spectrum measurement for the polyvinylidene fluoride to which the functional group is bonded and B is an integral value from a peak of the carboxyl group in the $^1$H NMR spectrum measurement for the polyvinylidene fluoride to which the functional group is bonded.

BACKGROUND ART

In recent years, with the technology development and demand increase for mobile devices, demand for batteries as an energy source has been rapidly increased, and accordingly, various studies on batteries to meet the various demands have been conducted. Particularly, research on a lithium secondary battery having a high energy density and excellent life-time and cycle characteristics as a power source of the devices is being actively conducted.

The lithium secondary battery includes: a positive electrode including a positive electrode active material capable of intercalating/deintercalating lithium ions; a negative electrode including a negative electrode active material capable of intercalating/deintercalating lithium ions; and an electrode assembly, in which a microporous separator is interposed between the positive electrode and the negative electrode, including a non-aqueous electrolyte which contains lithium ions.

The positive electrode may include a conductive material to improve conductivity. As the conductive material, a dot-type conductive material such as carbon black, a linear-type conductive material such as a carbon nanotube, or the like may be used.

In recent years, to increase an energy density of the positive electrode, studies for increasing a content of the positive electrode active material in the positive electrode active material layer have been conducted. One solution is to reduce a content of the conductive material and/or the binder in the positive electrode active material layer. At this time, when the content of the conductive material is decreased, the relative content of the positive electrode active material is increased, thereby increasing the energy density of the positive electrode, but a problem of decreasing the conductivity of the positive electrode active material layer occurs. In addition, when the content of the conductive material and/or the binder is decreased, adhesion (positive electrode adhesion) between the positive electrode active material layer and the current collector is decreased, thereby deteriorating the life-time characteristics of a battery.

Accordingly, a positive electrode having sufficient positive electrode adhesion while increasing an energy density of the positive electrode has been required.

DISCLOSURE OF THE INVENTION

Technical Problem

An aspect of the present invention provides a positive electrode and a secondary battery which includes said positive electrode and has improved capacity and resistance, the positive electrode having sufficient positive electrode adhesion while increasing an energy density of the positive electrode.

Technical Solution

According to an aspect of the present invention, there is provided a positive electrode including: a current collector; and a positive electrode active material layer disposed on the current collector, wherein the positive electrode active material layer includes a positive electrode active material, a conductive material, and a binder, the conductive material contains at least any one among carbon black and a carbon nanotube and the binder contains polyvinylidene fluoride to which a functional group is bonded, and the functional group has a carboxyl group, and in the polyvinylidene fluoride to which the functional group is bonded, a content of the carboxyl group calculated by Equation 1 below is 1.1-3.0 mol %:

$$[B/(A+B)] \times 100 \qquad \text{[Equation 1]}$$

where A is an integral value from a peak of a vinylidene fluoride-derived unit in the $^1$H NMR spectrum measurement for the polyvinylidene fluoride to which the functional group is bonded and B is an integral value from a peak of the carboxyl group in the $^1$H NMR spectrum measurement for the polyvinylidene fluoride to which the functional group is bonded.

According to another aspect of the present invention, there is provided a secondary battery including said positive electrode.

Advantageous Effects

According to the present invention, a positive electrode contains polyvinylidene fluoride having an appropriate content of functional groups together with carbon black and/or a carbon nanotube, thereby improving positive electrode adhesion of the positive electrode and suppressing volume expansion of the positive electrode during charging and discharging. Accordingly, capacity and resistance of a manufactured battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In the specification, an average particle diameter ($D_{50}$) may be defined as a particle diameter corresponding to 50% of a volume accumulation amount in a particle diameter distribution curve of particles. The average particle diameter ($D_{50}$) may be measured by using, for example, a laser diffraction method. Since the laser diffraction method generally enables to measure a particle diameter of several millimeters (mm) from a submicron region, result values having high reproducibility and high resolvability may be obtained.

A positive electrode according to an aspect of the present invention includes: a current collector; and a positive electrode active material layer disposed on the current collector, wherein the positive electrode active material layer includes a positive electrode active material, a conductive material, and a binder, the conductive material contains at least any one among carbon black and a carbon nanotube and the binder contains polyvinylidene fluoride to which a functional group is bonded, and the functional group has a carboxyl group, and in the polyvinylidene fluoride to which the functional group is bonded, a content of the carboxyl group calculated by Equation 1 below is 1.1-3.0 mol %:

$$[B/(A+B)]\times 100 \quad \text{[Equation 1]}$$

where A is an integral value from a peak of a vinylidene fluoride-derived unit in the $^1$H NMR spectrum measurement for the polyvinylidene fluoride to which the functional group is bonded and B is an integral value from a peak of the carboxyl group in the $^1$H NMR spectrum measurement for the polyvinylidene fluoride to which the functional group is bonded.

The current collector is not particularly limited as long as having electrical conductivity without causing any chemical changes in the battery. The current collector may use, for example, copper, stainless steel, aluminum, nickel, titanium, sintered carbon, or aluminum or stainless steel of which a surface is surface-treated with carbon, nickel, titanium, silver, or the like. Specifically, a transition metal which adsorbs carbon well such as copper and nickel may be used as a current collector.

The positive electrode active material layer may be disposed on the current collector. The positive electrode active material layer may be disposed on one side or both sides of the current collector. The positive electrode active material layer may include a positive electrode active material, a conductive material, and a binder.

The positive electrode active material may be a conventionally used positive electrode active material. Specifically, the positive electrode active material may use: a layered compound or a compound in which one or more transition metals are substituted such as lithium cobalt oxide ($LiCoO_2$) and lithium nickel oxide ($LiNiO_2$); lithium manganese oxide such as Formulae $Li_{1+y1}Mn_{2-y1}O_4$ ($0 \leq y1 \leq 0.33$), $LiMnO_3$, $LiMn_2O_3$, and $LiMnO_2$; lithium copper oxide ($Li_2CuO_2$); vanadium oxide such as $LiV_3O_8$, $V_2O_5$, and $Cu_2V_2O_7$; Ni-site type lithium nickel oxide represented by Formula $LiNi_{1-y2}M1_{y2}O_2$ (where M1 is Co, Mn, Al, Cu, Fe, Mg, B, or Ga and $0.01 \leq y2 \leq 0.3$); lithium manganese composite oxide represented by Formula $LiMn_{2-y3}M2_{y3}O_2$ (where M2 is Co, Ni, Fe, Cr, Zn, or Ta and $0.01 \leq y3 \leq 0.1$) or $Li_2Mn_3M3O_8$ (where M3 is Fe, Co, Ni, Cu, or Zn); $LiMn_2O_4$ in which some of Li's therein are substituted with alkaline earth metal ions, or the like, but the embodiment is not limited thereto. Specifically, the positive electrode active material may be at least any one among $Li[Ni_{a1}Mn_{b1}Cl_{c1}]O_2$ ($0.50 \leq a1 \leq 0.70$, $0.15 \leq b1 \leq 0.25$, $0.15 \leq c1 \leq 0.25$, and $a1+b1+c1=1$) and $Li[Ni_{a2}Mn_{b2}Co_{c2}]O_2$ ($0.72 \leq a2 \leq 0.90$, $0.05 \leq b2 \leq 0.14$, $0.05 \leq c2 \leq 0.14$, and $a2+b2+c2=1$). $Li[Ni_{a1}Mn_{b1}Co_{c1}]O_2$ and $Li[Ni_{a2} Mn_{b2}Co_{c2}]O_2$ have high energy densities, thereby improving capacity of a battery.

An average particle diameter ($D_{50}$) of the positive electrode active material may be 3-20 μm, specifically, 6-18 μm, and more specifically, 9-16 μm. When the above range is satisfied, high-temperature life-time characteristics and output characteristics of a battery may be improved.

The conductive material serves to improve conductivity of the positive electrode active material layer and reduce resistance of a battery. The conductive material may be at least any one among carbon black and a carbon nanotube.

The carbon black may be composed of secondary particles in which primary particles are aggregated.

An average particle diameter of the primary particles in the carbon black may be 5-500 nm, specifically, 10-300 nm, and more specifically, 20-100 nm. When the above range is satisfied, aggregation between the conductive materials is suppressed and the carbon black may be uniformly dispersed in the positive electrode active material layer. At the same time, deterioration of battery efficiency caused by using a conductive material having excessively large particles may be prevented, thereby suppressing deterioration of battery operating performance. The average particle diameter of the primary particles may be derived by calculating an average of particle diameters of 40 primary particles measured by TEM or SEM.

An average particle diameter ($D_{50}$) of the secondary particles in the carbon black may be 100-1000 nm, and specifically 200-600 nm. The average particle diameter means an average particle diameter of the secondary particles. When the above range is satisfied, the carbon black may be easily dispersed and the electric conductivity in the positive electrode may be improved, thereby improving the battery performance.

A BET specific surface area of the carbon black may be 100-150 m$^2$/g, and specifically 110-150 m$^2$/g. When the above range is satisfied, the conductivity of the carbon black is sufficient, thereby reducing resistance of the positive electrode. At the same time, viscosity of a positive electrode slurry may also be prevented from increasing excessively, and accordingly, there may be an advantage in transporting and applying the positive electrode slurry.

The carbon nanotube may be a bundle-type carbon nanotube. The bundle-type carbon nanotube may include a plurality of carbon nanotube units. Specifically, unless otherwise described, the 'bundle-type' refers to a secondary form of a bundle or rope shape in which a plurality of carbon nanotube units are aligned or entangled in a substantially parallel orientation to a longitudinal axis of the carbon nanotube unit. The carbon nanotube unit, in which a graphite sheet is rolled up into a cylinder shape having a nano-sized diameter, has a sp$^2$ bonding structure. At this time, depending on rolled up angle and structure of the graphite sheet, characteristics of a conductor or a semiconductor may be determined. The bundle-type carbon nanotube may be uniformly dispersed in the production of a positive electrode as compared with an entangled carbon nanotube, and accordingly, a conductive network in the positive electrode may be smoothly formed, thereby improving the conductivity of the positive electrode.

The carbon nanotube units may be classified into, depending on the number of bonds forming a wall, a single walled carbon nanotube (SWCNT) unit, a double-walled carbon nanotube (DWCNT) unit, and a multiwalled carbon nanotube (MWCNT) unit. Specifically, the carbon nanotube unit may be a multi-walled carbon nanotube unit. The multi-walled carbon nanotube unit is preferable because it requires a low energy for dispersion and has a dispersion condition within an easy control level as compared with the single walled carbon nanotube unit and the double-walled carbon nanotube unit.

An average diameter of the carbon nanotube units may be 1-30 nm, specifically 3-26 nm, and more specifically, 5-22 nm. When the above range is satisfied, the carbon nanotube may be uniformly dispersed in the positive electrode slurry, thereby improving the conductivity of the produced positive electrode. The average diameter may be an average value of diameters of 40 carbon nanotube units measured by TEM or SEM.

A BET specific surface area of the carbon nanotube may be 100-300 m$^2$/g, specifically 125-275 m$^2$/g, and more specifically, 150-250 m$^2$/g. When the above range is satisfied, the carbon nanotube may be uniformly dispersed in the positive electrode slurry, thereby improving the conductivity of the produced positive electrode. The BET specific surface area may be measured by a nitrogen adsorption BET method.

Specifically, the conductive material may be any one among carbon black and a carbon nanotube, and more preferably, may be a carbon nanotube. When the conductive material is a carbon nanotube, the positive electrode adhesion may be further improved due to high affinity and adsorption between, to be described later, polyvinylidene fluoride to which a functional group is bonded and the carbon nanotube.

The conductive material may be contained in the positive electrode active material layer in an amount of 0.5-3.0 wt %, specifically 0.5-2.6 wt %, and more specifically, 0.5-2.3 wt %. When the above range is satisfied, the content of the positive electrode active material may be increased while ensuring the conductivity of the positive electrode, thereby improving the capacity of the positive electrode. Particularly, when the carbon nanotube is used as the conductive material, the carbon nanotube may be contained in the positive electrode active material layer in an amount of 0.5-1.6 wt %, specifically 0.5-1.2 wt %.

The binder may include polyvinylidene fluoride to which a functional group is bonded.

A weight average molecular weight of the polyvinylidene fluoride to which a functional group is bonded may be 700,000-2,000,000 g/mol, specifically 710,000-1,800,000 g/mol, and more specifically, 750,000-1,500,000 g/mol. When the above range is satisfied, the polyvinylidene fluoride to which a functional group is bonded may be easily dissolved in an organic solvent, so that the positive electrode slurry formed in the production of the positive electrode may have viscosity of an appropriate level. Accordingly, the positive electrode slurry may be smoothly applied and the positive electrode adhesion of the produced positive electrode may be improved. When the above range is satisfied, the resistance of the manufactured battery may also be prevented from rising excessively.

Since the functional group has interactions with the positive electrode active material and/or the conductive material, phase stability and viscosity of the positive electrode slurry may be increased at a specific shear rate when a shear force is applied to the positive electrode slurry. Accordingly, when the positive electrode slurry is applied and dried on the current collector, migration of the binder may be suppressed and the binder may be uniformly dispersed in the positive electrode active material layer, thereby improving the positive electrode adhesion.

Specifically, the functional group may have a carboxyl group. For example, the functional group may be a carboxyl group. Since the carboxyl group has a strong binding force with a hydroxy group which is inevitably present on a surface of the current collector, the positive electrode adhesion may be further improved. Furthermore, the functional group may further have at least any one selected from the group consisting of a sulfonic acid group, a phosphoric acid group, and a hydroxy group.

The binder may be the polyvinylidene fluoride to which the functional group is bonded. That is, the binder may include the polyvinylidene fluoride to which the functional group is bonded without including polyvinylidene fluoride to which the functional group is not bonded. When the binder is formed of only polyvinylidene fluoride to which the functional group is not bonded, the interaction between the conductive material and the binder in the positive electrode slurry may weaken, so that the migration of the binder may occur when the positive electrode slurry is applied on the current collector. In addition, the affinity and adsorption of the carbon black or the carbon nanotube with the binder may also become insufficient. Accordingly, the positive electrode adhesion and life-time characteristics of a battery may be deteriorated. When polyvinylidene fluoride to which the functional group is not bonded is used together with the polyvinylidene fluoride to which the functional group is bonded, a functional group content, particularly a carboxyl group content, to the total polyvinylidene fluoride content in the positive electrode active material layer may be changed. In addition, in the positive electrode slurry, phase separation may occur between the polyvinylidene fluoride to which the functional group is bonded and polyvinylidene fluoride to which the functional group is not bonded, thereby decreasing the phase stability of the positive electrode slurry is decreased, and finally, the performances of the positive electrode and battery may be deteriorated. Accordingly, the binder may be the polyvinylidene fluoride to which the functional group is bonded.

In the polyvinylidene fluoride to which the functional group is bonded, the content of the carboxyl group calculated by Equation 1 below may be 1.1-3.0 mol %, specifically 1.1-2.5 mol %, and 1.2-2.0 mol %.

$$[B/(A+B)]\times 100 \quad\quad\quad [\text{Equation 1}]$$

where A is an integral value from a peak of a vinylidene fluoride-derived unit in the $^1$H NMR (proton nuclear magnetic resonance) spectrum measurement for the polyvinylidene fluoride to which the functional group is bonded and B is an integral value from a peak of the carboxyl group in the $^1$H NMR spectrum measurement for the polyvinylidene fluoride to which the functional group is bonded.

When the content of the carboxyl group is less than 1.1 mol %, the binding force between the polyvinylidene fluoride and the current collector is insufficient, thereby deteriorating excessively the positive electrode adhesion. Accordingly, the positive electrode active material layer is easily desorbed from the current collector, thereby deteriorating the life-time characteristics of a battery. Meanwhile, when the content of the carboxyl group is more than 3.0 mol %, the affinity between the electrolyte solution and the binder is excessively increased, and accordingly, the binder or the positive electrode active material layer is excessively expanded due to the electrolyte solution in a high temperature environment when a battery is operated, thereby deteriorating the positive electrode adhesion and deteriorating the life-time characteristics of a battery.

Accordingly, when the carboxyl group is used in the content range of 1.1-3.0 mol %, which is a preferable range for maintaining the positive electrode adhesion, the life-time characteristics of a battery may be improved. Furthermore, when the conductive material is a carbon nanotube, the positive electrode adhesion may be maintained even if the carbon nanotube is used in a small amount. A molar percentage (mol %) of the functional group may be measured by a $^1$H NMR (proton nuclear magnetic resonance) method. Specifically, the polyvinylidene fluoride in which the functional group is bonded may be analyzed by nuclear magnetic resonance spectroscopy, and then, the molar percentage (mol %) of the functional group may be confirmed by using a relative ratio of the integral value from the peak.

The polyvinylidene fluoride in which the functional group is bonded may be contained in the positive electrode active material layer in an amount of 0.5-3.0 wt %, specifically 0.7-2.5 wt %, and more specifically 1.0-2.3 wt %. When the above range is satisfied, the positive electrode adhesion may be maintained at a high level and increase of the battery resistance caused by the content of the polyvinylidene fluoride to which the functional group is excessively bonded may be prevented.

The positive electrode active material layer may further include a dispersant. The dispersant may serve to improve dispersibility of the compositions in the positive electrode slurry. The dispersant may be at least any one among a nitrile butadiene rubber (NBR) and a hydrogenated-nitrile butadiene rubber (H-NBR), and specifically, may be a hydrogenated nitrile butadiene rubber.

A weight average molecular weight of the dispersant may be 100,000-700,000 g/mol, and specifically, may be 200,000-500,000 g/mol. When the above range is satisfied, the conductive material may be uniformly dispersed in the positive electrode active material layer even with a small amount of the dispersant while preventing viscosity of the conductive material dispersion liquid used for dispersing the conductive material from rising excessively, thereby improving manufacture processability.

A secondary battery according to another aspect of the present invention includes: a positive electrode; a negative electrode; a separator interposed between the positive electrode and the negative electrode; and an electrolyte, wherein the positive electrode is the same as the positive electrode of the described embodiment. Therefore, a description of the positive electrode will be omitted.

The negative electrode may include a negative electrode current collector and a negative electrode active material layer disposed on one surface or both surfaces of the negative electrode current collector.

The negative electrode current collector is not particularly limited as long as having conductivity without causing any chemical changes in the battery. For example, as the negative electrode current collector, copper, stainless steel, aluminum, nickel, titanium, sintered carbon, aluminum or stainless steel of which a surface is surface-treated with carbon, nickel, titanium, or silver, or the like may be used. Specifically, a transition metal which adsorbs carbon well such as copper or nickel may be used as a current collector.

The negative electrode active material layer may include a negative electrode active material, a negative electrode conductive material, and a negative electrode binder.

The negative electrode active material may be a graphite-based active material particle or a silicon-based active material particle. The graphite-based active material particle may use at least one selected from the group consisting of artificial graphite, natural graphite, a graphitized carbon fiber, and a graphitized mesocarbon microbead, and particularly, when artificial graphite is used, rate characteristics may be improved. The silicon-based active material particle may use at least one selected from the group consisting of Si, $SiO_x$ (0<x<2), a Si—C composite, and a Si—Y alloy (where Y is an element selected from the group consisting of an alkali metal, an alkaline earth metal, a transition metal, a Group 13 element, a Group 14 element, a rare earth element, and a combination thereof), and particularly, when Si is used, a battery having high capacity may be obtained.

The negative electrode binder may include at least any one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated-EPDM, a styrene butadiene rubber (SBR), a fluorine rubber, polyacrylic acid, and a material in which hydrogen thereof is substituted with Li, Na, Ca, etc., and may also include various copolymers thereof.

The negative electrode conductive material is not particularly limited as long as having electrical conductivity without causing any chemical changes in the battery, and for example, graphite such as natural graphite and artificial graphite; carbon black such as carbon black, acetylene black, Ketjen black, channel black, furnace black, lamp black, and thermal black; a conductive fiber such as a carbon fiber and a metal fiber; a conductive tube such as a carbon nanotube; a metal powder such as a fluorocarbon powder, an aluminum powder, and a nickel powder; a conductive whisker such as zinc oxide and potassium titanate; a conductive metal oxide such as titanium oxide; a conductive material such as a polyphenylene derivative, or the like may be used.

The separator serves to separate the negative electrode and the positive electrode from each other and provide a transfer channel for lithium ions, and any separator may be used without particular limitation as long as typically used in a secondary battery, and particularly, a separator having excellent electrolyte solution retention ability while having low-resistance against transfer of the electrolyte ions may be preferably used for the separator. Specifically, a porous polymer film, for example, a porous polymer film formed of a polyolefin-based polymer (e.g., an ethylene homopolymer, a propylene homopolymer, an ethylene/butene copolymer, an ethylene/hexene copolymer, an ethylene/methacrylate copolymer, etc.) or a laminated structure having two or more layers thereof may be used. In addition, a conventional porous nonwoven fabric, for example, a nonwoven fabric formed of a glass fiber having a high melting point or a polyethylene terephthalate fiber may be used. Alternatively, a coated separator containing a ceramic composition or a polymer material may be used to ensure heat resistance or mechanical strength, and either a single layer structure or a multilayer structure may be selectively used.

The electrolyte may include an organic-based liquid electrolyte, an inorganic-based liquid electrolyte, a solid polymer electrolyte, a gel-type polymer electrolyte, a solid inorganic electrolyte, or a molten-type inorganic electrolyte which is available in the production of a lithium secondary battery, but the embodiment is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxy ethane, 2 methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like may be used.

Particularly, ethylene carbonate and propylene carbonate, which are cyclic carbonates among the carbonate-based organic solvents, may be preferably used because the carbonate-based organic solvents have high viscosity and dielectric constant to easily dissociate a lithium salt, and when dimethyl carbonate and diethyl carbonate, which are linear carbonates having low viscosity and dielectric constant, are added to the cyclic carbonates and mixed at an appropriate ratio, an electrolyte having high electric conductivity may be prepared, and the electrolyte prepared in this way may be more preferably used.

The metal salt may use a lithium salt and the lithium salt may be easily soluble in the non-aqueous electrolyte solution, and an anion of the lithium salt may use one selected from the group consisting of, for example, $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $CF_3CF_2(CF_3)_2CO_2^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte compositions, to improve life-time characteristics of a battery, to suppress capacity reduction of a battery, and to improve discharge capacity of a battery, the electrolyte may further contain one or more additives of, for example, a halo-alkylene carbonate-based compound (e.g., difluoroethylene carbonate), pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, an ammonium salt, pyrrole, 2-methoxy ethanol, aluminum trichloride, or the like.

According to another aspect of the present invention, there are provided: a battery module including the secondary battery as a unit cell; and a battery pack including said battery module. Since the battery module and the battery pack include the described secondary battery having high capacity, enhanced rate performance, and high cycle characteristics, the battery module and the battery pack may be used as a power source of a middle-sized or large-sized device selected from the group consisting of electric vehicles, hybrid electric vehicles, plug-in hybrid electric vehicles, and a power storage system.

Hereinafter, the present invention will be described in more detail according to examples. However, the invention may be embodied in many different forms and should not be construed as being limited to the embodiments set forth herein.

Example 1: Production of Positive Electrode (1) Preparation of Positive Electrode Slurry $Li[Ni_{0.8}Mn_{0.1}Co_{0.1}]O_2$ which has an average particle diameter ($D_{50}$) of 12 μm as a positive electrode active material; carbon black which is formed of secondary particles (average particle size ($D_{50}$): 300 nm), in which primary particles having an average particle diameter of 20 nm are aggregated, and has a BET specific surface area of 150 $m^2/g$ as a conductive material; and polyvinylidene fluoride which has a weight average molecular weight of 1,000,000 g/mol and contains a carboxyl group amount of 1.3 mol % determined by a $^1H$ NMR spectrum measurement as a binder were used.

A conductive material dispersion liquid containing the carbon black, a hydrogenated nitrile butadiene rubber (H-NBR) as a dispersant, and N-methylpyrrolidone (NMP) as a dispersion medium was prepared. In addition, a binder solution in which the binder is contained in N-methylpyrrolidone (NMP) was prepared.

Thereafter, the conductive material dispersion liquid and the positive electrode active material were added into the binder solution and stirred for 1 hour to prepare a positive electrode slurry. A weight ratio of the positive electrode active material, carbon black, binder, and dispersant in the positive electrode slurry was 96.6:1.4:1.9:0.1 and a solid content in the positive electrode slurry was 71.0%.

(2) Production of Positive Electrode

The positive electrode slurry was applied to a positive electrode current collector (Al) having a thickness of 20 μm and dried in a vacuum oven at 130° C. for 6 hours. Thereafter, the current collector coated with the positive electrode slurry was rolled under a pressure of 10 MPa by using a roll heated to 60° C. As a result, a positive electrode having a final thickness (thicknesses of current collector and active material layer) of 78 μm and a loading amount of the positive electrode active material layer of 450 mg/25 cm² was produced.

Example 2: Production of Positive Electrode

A positive electrode of Example 2 was produced in the same manner as in Example 1 except that a bundle-type carbon nanotube (BET specific surface area: 200 m²/g) in which carbon nanotube units having an average diameter of 18 nm are aggregated was used instead of carbon black, and in the positive electrode slurry, a weight ratio of the positive electrode active material, carbon nanotube, binder, and dispersant was 97.7:0.7:1.5:0.1.

Comparative Example 1: Production of Positive Electrode

A positive electrode of Comparative Example 1 was produced in the same manner as in Example 1 except that the carboxyl group content of polyvinylidene fluoride was 3.5 mol % in Example 1.

Comparative Example 2: Production of Positive Electrode

A positive electrode of Comparative Example 2 was produced in the same manner as in Example 1 except that the carboxyl group content of the polyvinylidene fluoride was 0.1 mol % in Example 1.

Comparative Example 3: Production of Positive Electrode

A positive electrode of Comparative Example 3 was produced in the same manner as in Example 2 except that the carboxyl group content of polyvinylidene fluoride was 0.1 mol % in Example 2.

Comparative Example 4: Production of Positive Electrode

A positive electrode of Comparative Example 4 was produced in the same manner as in Example 1 except that the carboxyl group content of polyvinylidene fluoride was 0.8 mol % in Example 1.

Comparative Example 5: Production of Positive Electrode

A positive electrode of Comparative Example 5 was produced in the same manner as in Example 2 except that the carboxyl group content of polyvinylidene fluoride was 0.8 mol % in Example 2.

Experimental Example 1: Evaluation of Swelling Property of Binder Film in High-Temperature Electrolyte Solution For each of the binders used in Example 1 and Comparative Examples 1, 2, and 4, swelling property of the binder film in a high-temperature electrolyte solution was evaluated.

Binder used in Example 1: Polyvinylidene fluoride having carboxyl group content of 1.3 mol % determined by $^1$H NMR spectrum measurement Binder used in Comparative Example 1: Polyvinylidene fluoride having carboxyl group content of 3.5 mol % determined by $^1$H NMR spectrum measurement Binder used in Comparative Example 2: Polyvinylidene fluoride having carboxyl group content of 0.1 mol % determined by $^1$H NMR spectrum measurement Binder used in Comparative Example 4: Polyvinylidene fluoride having carboxyl group content of 0.8 mol % determined by $^1$H NMR spectrum measurement A binder film was prepared by using each of the binders. The binder (powder) 20.0 g was uniformly applied on a square steel plate on which a release film was placed. Thereafter, the square steel plate was placed on the applied powder and pressurized in hot press equipment under a pressure of 7,000 psi at 200° C. for 10 minutes to prepare a binder film.

The prepared binder film (thickness: 200 μm) was supported on an electrolyte solution (ethylene carbonate (EC)/ethylmethyl carbonate (EMC)=1/2 (volume ratio), $LiPF_6$ 1 mole), and then, stored at 60° C. for 120 hours. Thereafter, the binder film was taken out and a volume thereof was measured, and then, a volume change rate was calculated by an equation below to evaluate swelling property, and the result is shown in FIG. 1.

Volume change rate=[(Volume of binder film after storage−Volume of binder film before storage)/Volume of binder film before storage]×100

Figure 1:
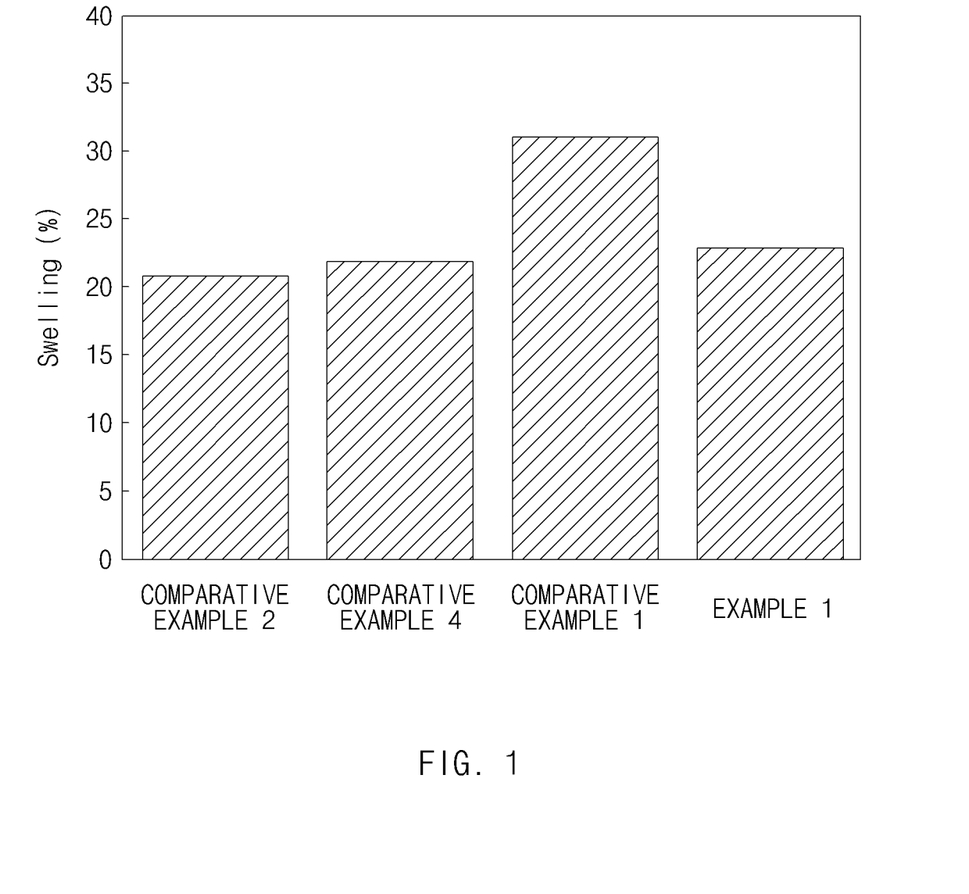
FIG. 1 is a graph showing a volume change rate of films when each of binders used in production of positive electrodes in Example 1 and Comparative Examples 1, 2, and 4 was prepared as a film-type and the respective films were immersed in a high-temperature electrolyte solution.

Referring to FIG. 1, when the binder having a carboxyl group content of more than 3.0 mol % was used, the thickness variation was excessively high. That is, it may be expected that, in the positive electrode of Comparative Example 1, the volume will also be excessively increased according to battery operation.

Experimental Example 2: Evaluation of Positive Electrode Adhesion and Increase Rate of Positive Electrode Adhesion For each of the positive electrodes in Examples 1 and 2 and Comparative Examples 1 to 5, the positive electrode was punched with a size of 20 mm×150 mm and fixed on a center of a slide glass having a size of 25 mm×75 mm by using a tape, and then, 90 degrees peel strength was measured by using a UTM while peeling off the current collector. An average of the measured five peel strengths was calculated and the average was determined as a positive electrode adhesion. The results are shown in FIGS. 2 and 3.

Figure 2:
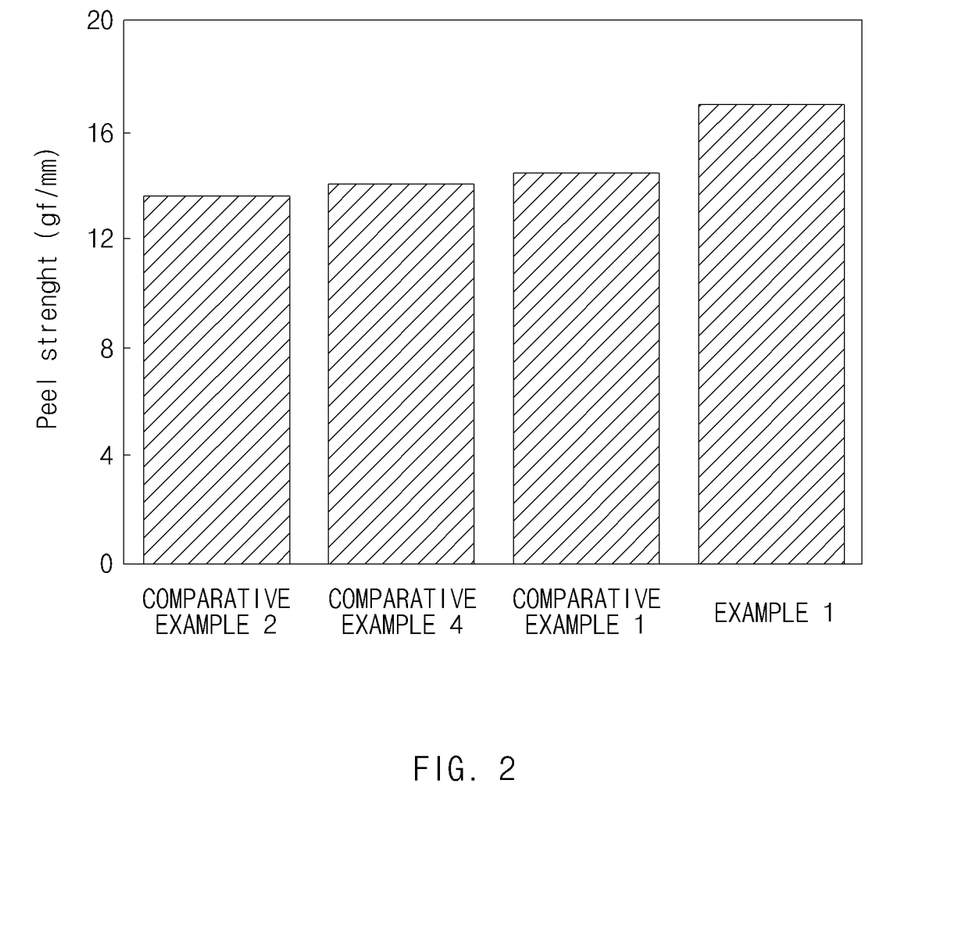
FIG. 2 is a graph showing positive electrode adhesion of positive electrodes in Example 1 and Comparative Examples 1, 2, and 4.

Referring to FIG. 2, when the carbon black was used as a conductive material, the positive electrode of Example 1, in which a molar percentage (mol %) of the carboxyl group was 1.3 mol % which satisfies a range of 1.1-3.0 mol %, had very excellent positive electrode adhesion as compared with the positive electrodes of Comparative Examples 1, 2, and 4 which do not satisfy the range.

Figure 3:
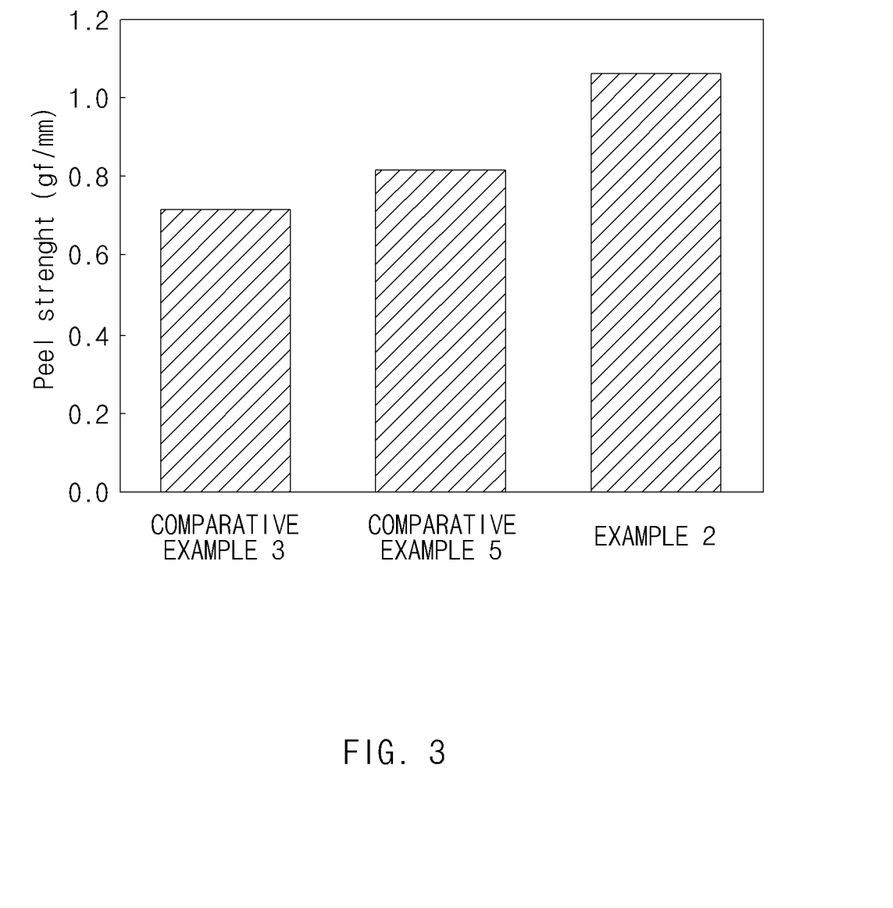
FIG. 3 is a graph showing positive electrode adhesion of positive electrodes in Example 2 and Comparative Examples 3 and 5.

Referring to FIG. 3, when the carbon nanotube was used as a conductive material, the positive electrode of Example 2, in which a molar percentage (mol %) of the carboxyl group was 1.3 mol % which satisfies a range of 1.1-3.0 mol %, had very excellent positive electrode adhesion as compared with the positive electrodes of Comparative Examples 3 and 5 which do not satisfy the range.

Meanwhile, comparing Example 1 with Example 2, the increase rate of the positive electrode adhesion in Example 2, which uses a carbon nanotube instead of carbon black, was high because the interaction between the polyvinylidene fluoride containing an appropriate content of a carboxyl group and the carbon nanotube is relatively strong. The increase rates of the positive electrode adhesion in Examples 1 and 2 were calculated and shown in Table 1 below. That is, when the content of the carboxyl group is changed, the increase rate means how much the positive electrode adhesion is increased depending on which conductive material is used, and this represents that a combination of a conductive material type and a carboxyl group content in polyvinylidene fluoride having a functional group may be an important factor.

Increase rate of positive electrode adhesion in Example 1=[(Positive electrode adhesion in Example 1−Positive electrode adhesion in Comparative Example 2)/Positive electrode adhesion in Comparative Example 2]×100

Increase rate of positive electrode adhesion in Example 2=[(Positive electrode adhesion in Example 2−Positive electrode adhesion in Comparative Example 3)/Positive electrode adhesion in Comparative Example 3]×100

TABLE 1

| | Increase rate of positive electrode adhesion (%) |
|---|---|
| Example 1 | 11.8 |
| Example 2 | 48.0 |

Experimental Example 3: Evaluation of High-Temperature Storage Capacity and Resistance A battery was manufactured by using each of the positive electrodes in Example 1 and Comparative Examples 1, 2, and 4, and then, high-temperature storage capacity and resistance were evaluated.

Natural graphite as a negative electrode active material, carbon black as a negative electrode conductive material, and a styrene butadiene rubber (SBR) as a negative electrode binder were mixed with distilled water at a weight ratio of 92:2:6, respectively, to prepare a negative electrode slurry. The prepared slurry was applied to a negative electrode current collector (Cu) having a thickness of 20 μm and dried in a vacuum oven at 80° C. for 6 hours. Thereafter, the current collector in which the negative electrode slurry was applied was rolled under a pressure of 10 MPa by using a roll heated to 60° C. As a result, a negative electrode having a final thickness (thicknesses of negative electrode current collector and negative electrode active material layer) of 65 μm and a loading amount of the negative electrode active material layer of 250 mg/25 cm² was produced.

Each of the positive electrodes in Example 1 and Comparative Examples 1, 2, and 4 and the produced negative electrode, and a polyethylene separator were assembled in a stacking manner, and an electrolyte solution (ethylene carbonate (EC)/ethylmethyl carbonate (EMC)=1/2 (volume ratio), $LiPF_6$ 1 mole) was injected into the assemble battery to prepare a lithium secondary battery.

Figure 4:
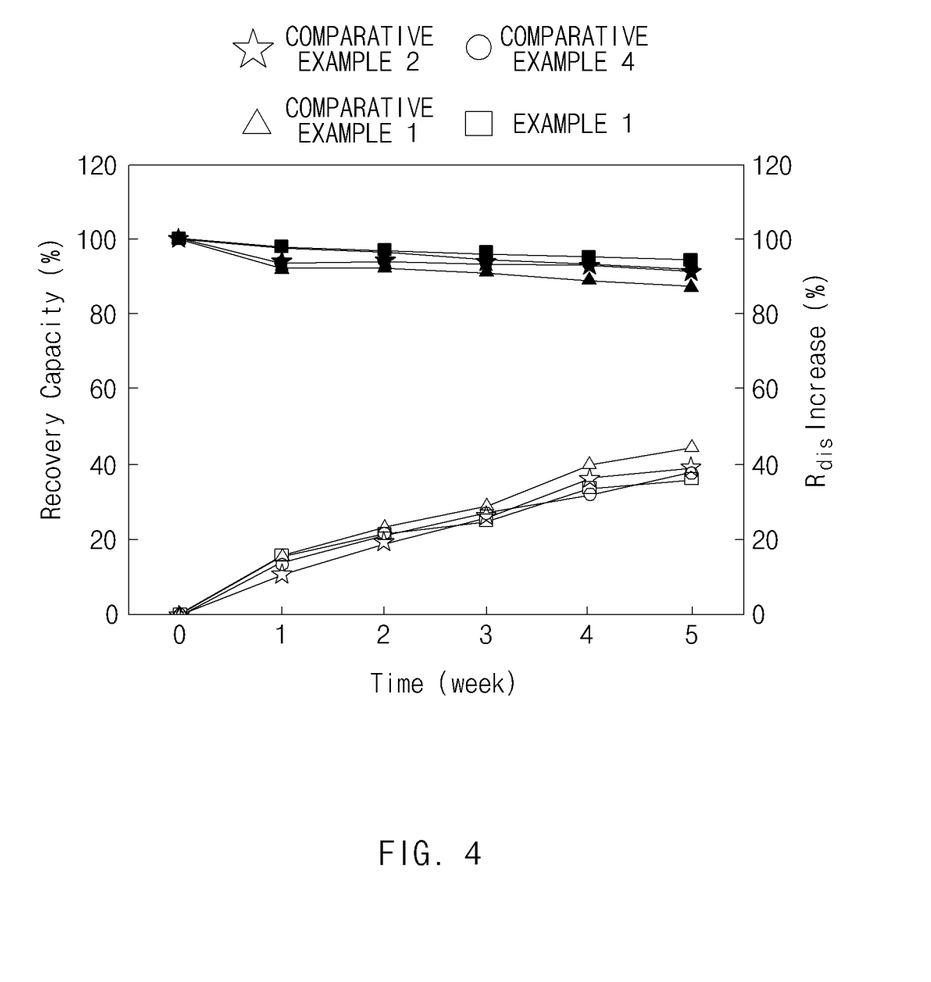
FIG. 4 is a graph showing capacity retention rate and resistance increase rate of batteries when the batteries each including a positive electrode in Example 1 and Comparative Examples 1, 2, and 4, respectively, were stored at a high-temperature.

Charge and discharge were performed on each of the manufactured batteries to evaluate a battery capacity retention rate and an increase rate of resistance, and the results are shown in FIG. 4. Specifically, for each of the lithium secondary batteries, a first cycle and a second cycle were charged and discharged at 25° C. at 0.1 C, and a third cycle was terminated in a state that the battery had been charged (a state that lithium was inserted into the negative electrode) at 0.1 C. Thereafter, the batteries were stored in a chamber at 60° C. for one week and discharged at 0.1 C, and then the capacity and resistance thereof were confirmed.

Charge condition: CC (constant current)/CV (constant voltage) (4.25 V/0.05 C cut-off)

Discharge condition: CC (constant current) condition 2.5 V cut-off

The process was repeated for 5 weeks and the capacity retention rate and the increase rate of resistance were calculated and evaluated through equations below for each week.

Capacity retention ratio (%)=(Discharge capacity after storage for N weeks/First cycle discharge capacity)×100

Increase rate of resistance (%)=(Discharge resistance after storage for N weeks/First cycle discharge resistance)×100

(where N is 1 to 5.)

Referring to FIG. 4, it was confirmed that, during storage at a high temperature, the battery including the positive electrode of Example 1 had the high capacity retention rate and the low increase rate of the battery resistance as compared with the batteries including the positive electrodes of Comparative Examples 1, 2, and 4.

The invention claimed is:

1. A positive electrode comprising:
   a current collector; and
   a positive electrode active material layer disposed on the current collector,
   wherein the positive electrode active material layer includes a positive electrode active material, a conductive material, and a binder,
   the conductive material contains a carbon nanotube,
   the binder contains polyvinylidene fluoride to which a functional group is bonded,
   the functional group has a carboxyl group, and
   in the polyvinylidene fluoride to which the functional group is bonded, a content of the carboxyl group calculated by Equation 1 below is 1.1 to 3.0 mol %,
   wherein the polyvinylidene fluoride to which the functional group is bonded is contained in the positive electrode active material layer in an amount of 0.5 to 3.0 wt %, and
   wherein the conductive material is contained in the positive electrode active material layer in an amount of 0.5 to 3.0 wt %:

$$[B/(A+B)]\times 100 \qquad \text{[Equation 1]}$$

wherein A is an integral value from a peak of a vinylidene fluoride-derived unit in the $^1$H NMR spectrum measurement for the polyvinylidene fluoride to which the functional group is bonded, and
   B is an integral value from a peak of the carboxyl group in the $^1$H NMR spectrum measurement for the polyvinylidene fluoride to which the functional group is bonded.

2. The positive electrode of claim 1,
   wherein a weight average molecular weight of the polyvinylidene fluoride to which the functional group is bonded is 700,000-2,000,000 g/mol.

3. The positive electrode of claim 1,
   wherein the carbon nanotube is a bundle-type carbon nanotube comprising a plurality of carbon nanotube units.

4. The positive electrode of claim 3,
   wherein an average diameter of the carbon nanotube units is 1 to 30 nm.

5. The positive electrode of claim 1,
wherein a BET specific surface area of the carbon nanotube is 100 to 300 m$^2$/g.

6. A secondary battery comprising:
the positive electrode of claim 1;
a negative electrode;
a separator interposed between the positive electrode and the negative electrode; and
an electrolyte.

\* \* \* \* \*